No. 874,014. PATENTED DEC. 17, 1907.
M. KURTZON.
ADJUSTABLE BRACKET.
APPLICATION FILED JAN. 25, 1906.
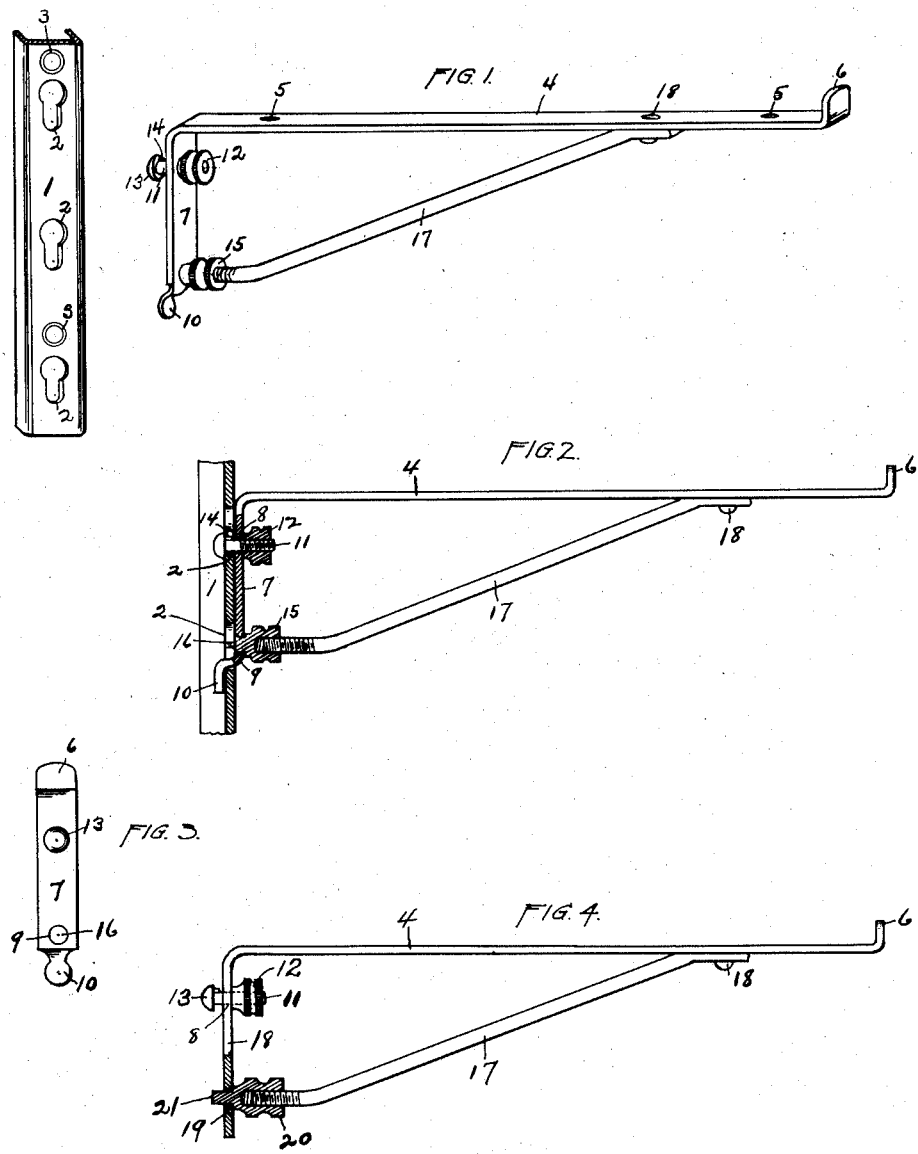
WITNESSES
INVENTOR

UNITED STATES PATENT OFFICE.

MORRIS KURTZON, OF CHICAGO, ILLINOIS.

ADJUSTABLE BRACKET.

No. 874,014.　　　Specification of Letters Patent.　　　Patented Dec. 17, 1907.

Application filed January 25, 1906. Serial No. 297,751.

*To all whom it may concern:*

Be it known that MORRIS KURTZON, a citizen of the United States, residing at Chicago, in the county of Cook and State of Illinois, has invented certain new and useful Improvements in Adjustable Brackets, of which the following is a specification.

My invention relates to improvements in adjustable brackets having a vertical and a horizontal arm, a brace rod supporting the horizontal arm, and lugs for connecting the bracket with a vertical support or standard having key-hole slots; and the especial objects of my improvements are to provide improved means, for connecting the bracket with the standard, for adjusting the horizontal arm, and for locking the upper stud in the key-hole slot.

In the drawing—Figure 1 is a perspective view of one form of my bracket and a section of the standard or vertical support; Fig. 2 a side elevation view of the bracket and standard connected, the latter and the thumb nuts and the vertical arm being shown in section; Fig. 3 an elevation view of the left hand end of the bracket as shown in Fig. 1; and Fig. 4 a side elevation view of a bracket of modified construction, the lower thumb nut and an adjacent portion of the vertical arm being shown in section.

Referring to the drawing in detail—the reference numeral 1, represents the standard, vertical support or channel iron provided in its face with the key-hole slots 2, and the screw holes 3. The reference numeral 4, represents the horizontal arm of the bracket, provided with two screw holes 5, and having its outer end upturned to form a stop 6, for a shelf. The opposite end of the horizontal bar 4, is bent downwardly to form a vertical arm 7, in which there are formed two perforations 8, and 9, and having its lower end bent rearwardly and downwardly to form a hook 10, adapted to be inserted in one of the key-hole slots 2, in the standard 1, and engage the rear face of the latter as shown in Fig. 2. Arranged in the perforation 8, is a bolt 11, having its inner end screw threaded to receive the thumb nut 12, and provided at its opposite end with a head 13, adapted to be inserted in one of the said key-hole slots and to engage the rear face of the standard as indicated in Fig. 2. Formed on the shank of the bolt and adjacent to its head is a lug 14, adapted to engage the wall of the key-hole slot and prevent the bolt from rotating when the thumb nut is turned. Below the thumb nut 12 and opposite the perforation 9, is a thumb nut 15, having a shank 16, rotatably arranged in the perforation 9, which is counter bored on the rear side of the vertical arm, and the outer end of shank upset to prevent its removal. A brace 17, has one end screw threaded and inserted in the thumb nut 15, and has its opposite end secured to and near the outer end of the horizontal arm 4, by a rivet 18.

The operation of the above described bracket and standard is as follows: The standard is secured to any suitable vertical base with screws inserted in the screw holes 3. The bolt head 13, and the hook 10, are then passed through the upper or larger portion of the key-hole slots 2, and their shanks permitted to slide downwardly into the lower end of said slots with the said bolt head 13, and hook 10, engaging the rear face of the standard. The thumb nut 12, is then screwed up firmly against the vertical arm 7. The horizontal arm 4, is then leveled by adjusting the thumb nut 15, after which the bracket is ready to receive a shelf which may be secured thereto by screws inserted in the openings 5.

In the modified construction shown in Fig. 4: 4, indicates the horizontal arm; 6, the stop at the outer end of the horizontal arm; 18, the vertical arm provided near its upper end with a perforation 8, and near its lower end with a perforation 19; 11, a bolt arranged in the perforation 8, and provided with a head 13. 12, a thumb nut for said bolt; 20, a thumb nut having a shank 21, extending through the perforation 19, and forming a stud adapted to enter one of the key-hole slots in the standard 1; and 17, a brace connecting the thumb nut 20, with the outer end of the horizontal arm 4. This bracket is constructed and operated in the same manner as the one previously described except that the stud 21, is substituted for the hook 10. All parts of the brackets are made preferably of iron or steel.

Having thus described my invention what I claim as new and desire to secure by Letters Patent is—

In combination with a standard having key-hole slots, a bracket comprising a vertical arm and a horizontal arm, said vertical arm having a perforation near its lower end and provided on its lower end with an integral hook adapted to enter one of said keyhole slots, a nut rotatably and non-removably mounted in said perforation, a brace connecting the said nut with the outer portion of the horizontal arm, and means for connecting the upper end of the vertical arm with the standard.

In testimony whereof I affix my signature in presence of two witnesses.

MORRIS KURTZON.

Witnesses:
O. K. TREGO,
J. M. CRIPE.